(12) United States Patent
Ifuku

(10) Patent No.: US 9,961,426 B2
(45) Date of Patent: May 1, 2018

(54) CYLINDRICAL MEMBER HOLDING APPARATUS CAPABLE OF STABLY HOLDING CYLINDRICAL MEMBER

(71) Applicant: CANON KABUSHIKI KAISHA, Tokyo (JP)

(72) Inventor: Hirotaka Ifuku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 14/865,801

(22) Filed: Sep. 25, 2015

(65) Prior Publication Data

US 2016/0100236 A1    Apr. 7, 2016

(30) Foreign Application Priority Data

Oct. 3, 2014    (JP) .................................. 2014-204738

(51) Int. Cl.
| | |
|---|---|
| *H04R 9/08* | (2006.01) |
| *H04R 11/04* | (2006.01) |
| *H04R 17/02* | (2006.01) |
| *H04R 19/04* | (2006.01) |
| *H04R 21/02* | (2006.01) |
| *H04R 1/02* | (2006.01) |
| *F16M 13/02* | (2006.01) |
| *F16F 15/073* | (2006.01) |

(52) U.S. Cl.
CPC ........... *H04R 1/028* (2013.01); *F16F 15/073* (2013.01); *F16M 13/02* (2013.01)

(58) Field of Classification Search
USPC ....... 248/564, 567, 568, 570, 580, 581, 583, 248/599, 632, 634, 638, 230.4, 231.51, 248/316.5; 381/368, 361, 362, 363, 365, 381/366, 364
See application file for complete search history.

(56) References Cited

U.S. PATENT DOCUMENTS

| | | | | |
|---|---|---|---|---|
| 4,194,096 A | * | 3/1980 | Ramsey | ................... H04R 1/08 381/363 |
| 4,396,807 A | * | 8/1983 | Brewer | ................... H04R 1/08 248/604 |
| 4,514,598 A | * | 4/1985 | Plice | ....................... H04R 1/08 248/104 |

(Continued)

*Primary Examiner* — Terrell L McKinnon
*Assistant Examiner* — Michael McDuffie
(74) *Attorney, Agent, or Firm* — Cowan, Liebowitz & Latman, P.C.

(57) ABSTRACT

A cylindrical member holding apparatus which is flexible in an axial direction of a cylindrical member and resists being deformed in directions perpendicular to the axial direction of the cylindrical member. A plurality of elastically-deformable supporting portions are disposed on respective opposite sides of the cylindrical member held by a holder portion in a direction of an axis of the cylindrical member and connect a base portion and the holder portion together. The supporting portions have such a shape as to be more easily elastically deformed in a first direction than in a second and third direction. The first direction is the axial direction of the cylindrical member, the second direction is a direction that is perpendicular to the first direction and connects the holder portion and the base portion together, and the third direction is perpendicular to the first direction and also perpendicular to the second direction.

6 Claims, 9 Drawing Sheets

(56) References Cited

U.S. PATENT DOCUMENTS

| | | | | |
|---|---|---|---|---|
| 4,546,950 | A * | 10/1985 | Cech | F16F 1/46 |
| | | | | 211/60.1 |
| 4,991,220 | A * | 2/1991 | Wolf | H04R 1/08 |
| | | | | 381/361 |
| 6,682,043 | B1 * | 1/2004 | Hsieh | H04R 1/083 |
| | | | | 248/618 |
| 6,721,432 | B1 * | 4/2004 | Yamamoto | H04R 1/02 |
| | | | | 381/355 |
| 8,121,333 | B2 | 2/2012 | Woolf et al. | |
| 8,814,118 | B2 * | 8/2014 | Okita | H01F 7/0252 |
| | | | | 24/495 |
| 9,560,433 | B2 * | 1/2017 | Parker | H04R 1/08 |
| 2003/0035561 | A1 * | 2/2003 | Hsieh | H04R 1/08 |
| | | | | 381/361 |
| 2003/0197316 | A1 * | 10/2003 | Baumhauer, Jr. | H04R 1/083 |
| | | | | 267/136 |
| 2013/0004010 | A1 * | 1/2013 | Royer | H04R 1/08 |
| | | | | 381/368 |
| 2013/0221185 | A1 * | 8/2013 | Ogawa | F16L 3/13 |
| | | | | 248/634 |

* cited by examiner

CYLINDRICAL MEMBER HOLDING APPARATUS CAPABLE OF STABLY HOLDING CYLINDRICAL MEMBER

BACKGROUND OF THE INVENTION

Field of the Invention

The present invention relates to a cylindrical member holding apparatus which holds a cylindrical member such as a microphone.

Description of the Related Art

Vibrations externally applied to a microphone causes noise. To reduce such vibration noise, a microphone holder which holds the microphone is vibration-proofed.

In recent years, with attention focused on a direction in which a diaphragm (vibrating plate) of a microphone vibrates, there has been proposed a microphone holder with high resistance to vibrations in the direction in which the diaphragm vibrates, that is, an axial direction of the microphone when the microphone is attached to the microphone holder (the specification of U.S. Pat. No. 8,121,333).

According to this proposal, connecting a holder portion to a vibration source using two long and thin arm portions formed on a plane perpendicular to the axial direction of the microphone implements a holding structure that is flexible in the axial direction of the microphone and easily reduces vibrations.

According to the specification of U.S. Pat. No. 8,121,333 mentioned above, the degree of flexibility of the microphone holder depends on the length of the arm portions, and in order to increase the flexibility and enhance the vibration-proofing effect, it is necessary to connect the vibration source and the holder portion together using the longest possible arm portions. However, increasing the length of the arm portions will increase the flexibility not only in the axial direction of the microphone but also in directions perpendicular to the axial direction of the microphone.

To reduce noise of the microphone caused by external vibrations, it is only necessary to vibration-proof the microphone in the axial direction thereof, and vibration-proofing for the other directions does not have much effect on noise reduction. Being flexible in directions other than the axial direction of the microphone will bring about degradation in stability with which the microphone is held.

Specifically, a problem of the microphone swaying widely will arise when an inertia force is applied to the microphone holder during, for example, panning or tilting of a video camera on which the microphone holder is mounted.

SUMMARY OF THE INVENTION

The present invention provides a cylindrical member holding apparatus which is flexible in an axial direction of a cylindrical member and resists being deformed in directions perpendicular to the axial direction of the cylindrical member.

Accordingly, the present invention provides a cylindrical member holding apparatus comprising a base portion, a holder portion configured to hold a cylindrical member, and a plurality of elastically-deformable supporting portions configured to be disposed on respective opposite sides of the cylindrical member, which is held by the holder portion, in a direction of an axis of the cylindrical member and connect the base portion and the holder portion together, wherein the plurality of supporting portions have such a shape as to be more easily elastically deformed in a first direction than in a second direction and a third direction, where the first direction is the direction of the axis of the cylindrical member held by the holder portion, the second direction is a direction that is perpendicular to the first direction and connects the holder portion and the base portion together, and the third direction is a direction that is perpendicular to the first direction and also perpendicular to the second direction.

According to the present invention, in the cylindrical member holding apparatus, the plurality of supporting portions which connect the base portion and the holder portion together have such a shape as to be more easily elastically deformed in a fore-and-aft direction than in an up-down direction and a lateral direction. As a result, the cylindrical member holding apparatus is flexible in the axial direction of the cylindrical member and resists being deformed in the directions perpendicular to the axial direction of the cylindrical member.

Further features of the present invention will become apparent from the following description of exemplary embodiments (with reference to the attached drawings).

DESCRIPTION OF THE EMBODIMENTS

The present invention will now be described with reference to the drawings showing embodiments thereof.

Figure 1:
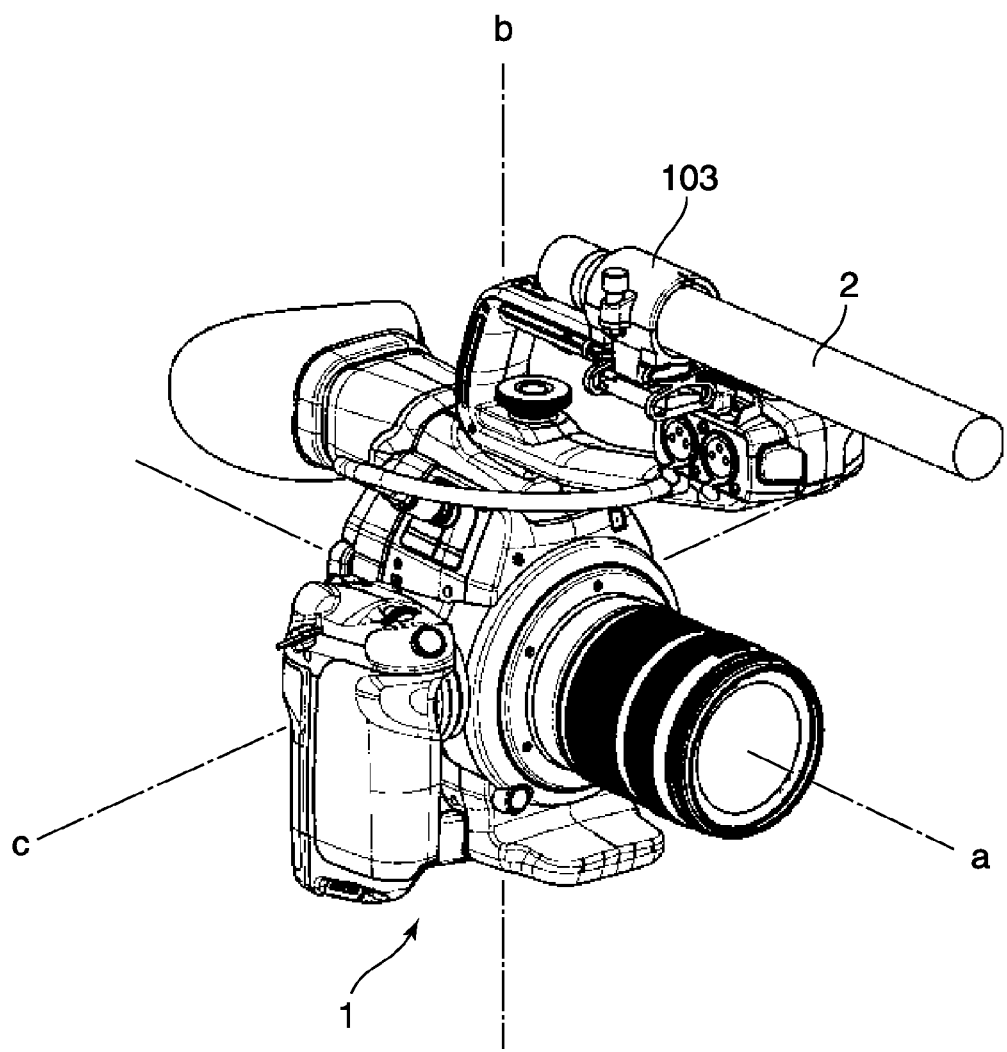
FIG. 1 is a perspective view of a video camera, which is exemplary electronic equipment on which a microphone holder which is a first embodiment of a cylindrical member holding apparatus according to the present invention is mounted, as viewed from front (object side).

FIG. 1 is a perspective view of a video camera, which is exemplary electronic equipment on which a microphone holder which is a first embodiment of a cylindrical member holding apparatus according to the present invention is mounted, as viewed from front (object side).

Referring to FIG. 1, the microphone holder 103 holds a microphone 2 which is connected to the video camera 1. It should be noted that in the following description, a direction of an optical axis a of a lens portion in the video camera 1 will be referred to as a fore-and-aft direction, and an object side in the fore-and-aft direction is referred to as a forward direction. A direction of an axis b perpendicular to the optical axis a and parallel to an up-and-down direction is referred to as an up-and-down direction, and in the up-and-down direction, a vertically upward direction will be referred to as an upward direction. A direction of an axis c perpendicular to the optical axis a and the axis b will be referred to as a lateral direction. Here, the fore-and-aft direction corresponds to a first direction of the present invention, the up-and-down direction corresponds to a second direction of the present invention, and the lateral direction corresponds to a third direction of the present invention.

Figure 2A:
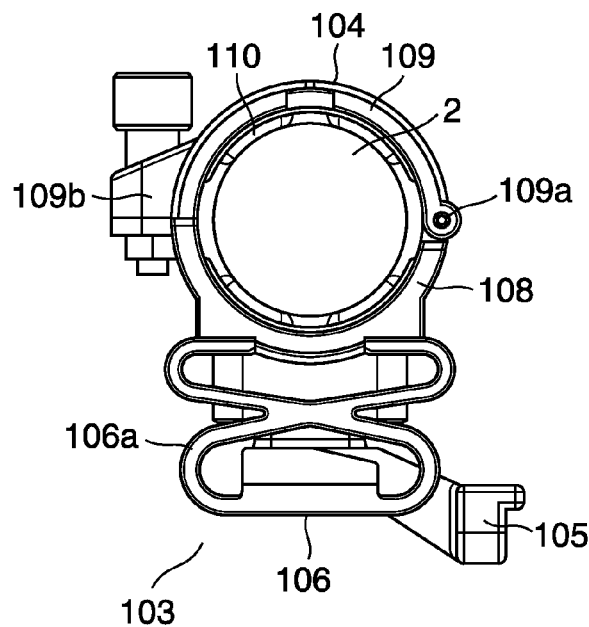
FIG. 2A is a front view of the microphone holder.
Figure 2B:
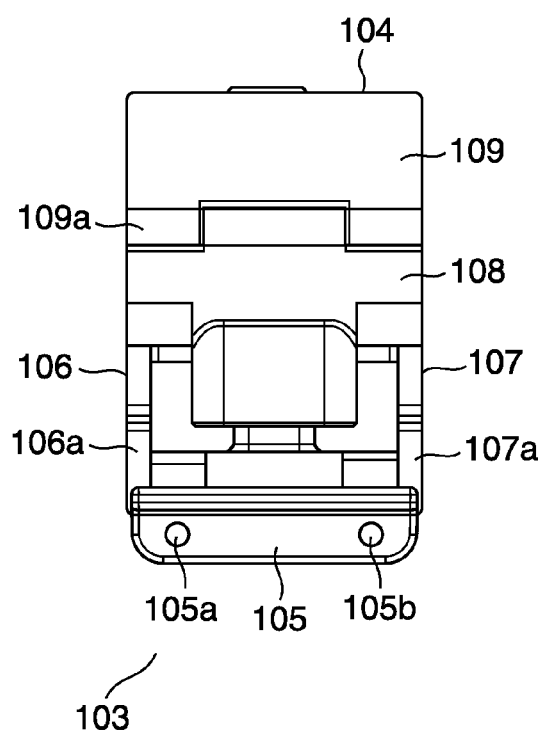
FIG. 2B is a side view of FIG. 2A.

FIG. 2A is a front view of the microphone holder 103, and FIG. 2B is a side view of FIG. 2A. Referring to FIGS. 2A and 2B, the microphone holder 103 has a holder portion 104, a base portion 105, and supporting portions 106 and 107.

The holder portion 104 is made of, for example, a hard resin material and removably holds the microphone 2 so as to cover an outer peripheral portion of the microphone 2 which is an exemplary cylindrical member according to the present invention. The holder portion 104 has a lower holder 108 and an upper holder 109, and the upper holder 109 is connected to the lower holder 108 so as to be rotatable with respect to the lower holder 108 via a hinge portion 109a.

The upper holder 109 has a screw portion 109b located at a position opposed to the hinge portion 109a of the holder portion 104 in a diameter direction. Loosening the screw portion 109b disconnects the lower holder 108 and the upper holder 109 from each other to enable the upper holder 109 to rotate about the hinge portion 109a with respect to the lower holder 108 in an opening and closing direction. This opens the upper holder 109 with respect to the lower holder 108 so that the microphone 2 can be placed inside the holder portion 104.

On the other hand, fastening the screw portion 109b connects the lower holder 108 and the upper holder 109 together so that the microphone 2 can be stably held inside the holder portion 104. There is vibration-proofing rubber 110 between an inner peripheral portion of the holder portion 104 and the microphone 2 so as to make it harder to transmit vibrations of the microphone holder 103 to the microphone 2.

The base portion 105 is a part of the microphone holder 103, which is removably attached to the video camera 1, and as with the holder portion 104, the base portion 105 is made of, for example, a hard resin material. Screw holes 105a and 105b are formed in the base portion 105, and the base portion 105 is fixed to the video camera 1 by screws, not shown, through the screw holes 105a and 105b.

The base portion 105 and the holder portion 104 are connected together by a plurality of supporting portions. In the example shown in FIGS. 2A and 2B, the base portion 105 and the holder portion 104 of the microphone holder 103 are connected together by two supporting portions 106 and 107.

The supporting portions 106 and 107 are made of, for example, an elastically deformable and soft resin material such as thermal plastic elastomer and disposed on opposite sides of the microphone 2 in an axial direction thereof (the direction of the optical axis a) held by the holder portion 104. The supporting portions 106 and 107 each have one end thereof connected to the base portion 105 and the other end thereof connected to the holder portion 104.

In the present embodiment, adhesive agents are used to connect the supporting portions 106 and 107 and the holder portion 104 together and connect the supporting portions 106 and 107 and the base portion 105 together, but concrete methods for connection, positions, shapes, and the number of connecting points are not particularly limited. For example, self-tap screws may be used in connection. Moreover, in the present embodiment, the supporting portions 106 and 107 have the same shape so as to reduce the cost of dies for molding, but the supporting portions 106 and 107 may have different shapes.

The supporting portion 106 has long and thin arm portions 106a which cross each other substantially in the form of an X between the holder portion 104 and the base portion 105 as the microphone holder 103 in FIG. 2A is viewed from front. Similarly, the supporting portion 107 has long and thin arm portions 107a which cross each other substantially in the form of an X between the holder portion 104 and the base portion 105.

The arm portion 106a and 107a have a substantially flat surface along a plane formed by the axis b and the axis c in FIG. 1 and are shaped to be relatively large in the up-and-down direction and the lateral direction and relatively thin in the fore-and-aft direction as compared to the up-and-down direction and the lateral direction. For this reason, the supporting portion 106 and 107 have a lower second moment of area under a load in the fore-and-aft direction than under a load in the up-and-down direction and the lateral direction and thus tend to be relatively deformed in the fore-and-aft direction. As a result, the microphone holder 103 as a whole is more easily deformed in the fore-and-aft direction than in the up-and-down direction and the lateral direction.

Moreover, ends of the arm portions 106a and 107a, which are substantially X-shaped, are connected in a curved state to the holder portion 104 and the base portion 106, and this reduces stress concentration when, for example, a load is imposed on the holder portion 104 in the up-and-down direction and the lateral direction. At the same time, the flexibility of the microphone holder 103 in the fore-and-aft direction is increased.

Referring to FIG. 2A, the width of the supporting portions 106 and 107 is substantially equal to the width of the holder portion 104 in the lateral direction, and hence the overall size of the microphone holder 103 does not increase due to the supporting portions 106 and 107.

Figure 14:
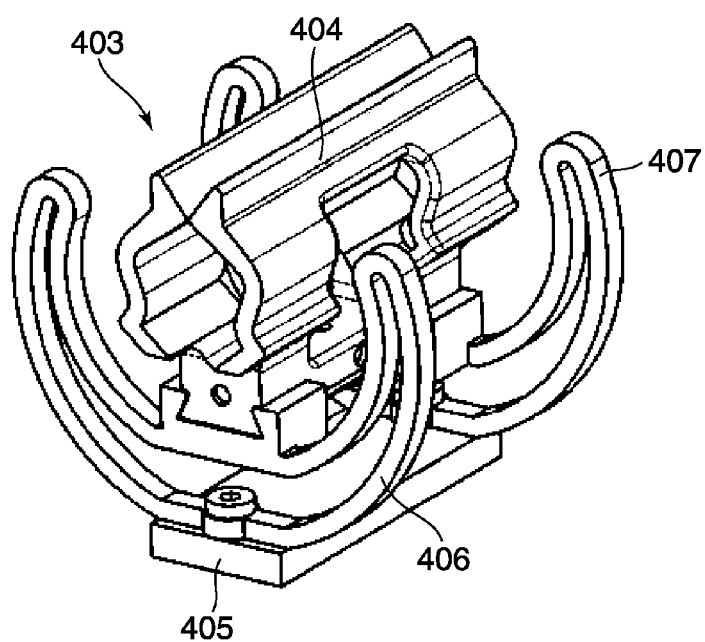
FIG. 14 is a perspective view of a conventional microphone holder.

A description will now be given of differences between the microphone holder 103 according to the present embodiment and a conventional microphone holder 403 in FIG. 14. FIG. 14 is a perspective view of the conventional microphone holder 403.

The microphone holder 103 according to the present embodiment and the conventional microphone holder 403 were compared to each other in terms of the amount of deformation caused by a predetermined load. The amounts of change in positions of the holder portion 104 of the microphone holder 103 according to the present embodiment and a holder portion 404 of the conventional microphone holder 403 relative to the base portions 104 and 405 when a predetermined load is imposed on the holder portion 104 and the holder portion 404 in the fore-and-aft direction, the up-and-down direction, and the lateral direction were obtained by linear analysis.

The amount of deformation of the conventional microphone holder 403 in the up-and-down direction was 0.15 times as large as the amount of change in the fore-and-aft direction, and the amount of deformation of the conventional microphone holder 403 in the lateral direction was 1.33 times as large as the amount of deformation in the fore-and-aft direction. The amount of deformation of the conventional microphone holder 403 in the up-and-down direction is considerably smaller than in the fore-and-aft direction, but the amount of deformation of the conventional microphone holder 403 in the lateral direction is greater than in the fore-and-aft direction.

The conventional microphone holder 403 is configured such that when it is designed to be flexible in the fore-and-aft direction so as to enhance the effect of reducing vibration noise by, for example, making arms of supporting portions 406 and 407 long, the flexibility in the lateral direction will increase further than that. For this reason, the conventional microphone holder 403 cannot hold a microphone with high stability when the microphone is attached thereto.

On the other hand, the amount of deformation of the microphone holder 103 according to the present embodiment in the up-and-down direction was 0.19 times as large as the amount of deformation in the fore-and-aft direction, and the amount of deformation of the microphone holder 103 according to the present embodiment in the lateral direction was 0.65 times as large as the amount of deformation in the fore-and-aft direction. The amount of deformation of the microphone holder 103 according to the present embodiment in the up-and-down direction is small as with the conventional microphone holder 403, and also, the amount of deformation of the microphone holder 103 according to the present embodiment in the lateral direction is smaller than in the fore-and-aft direction. Thus, the microphone holder 103 according to the present embodiment has low flexibility in the lateral direction.

The flexibility in the lateral direction being low is not a demerit from the viewpoint of reducing vibration noise, but is a characteristic that increases the stability with which a microphone is held by the microphone holder 103. The structure of the supporting portions 106 and 107 implements the microphone holder 103 which is totally excellent in terms of both vibration proofing and holding stability.

Figure 3A:
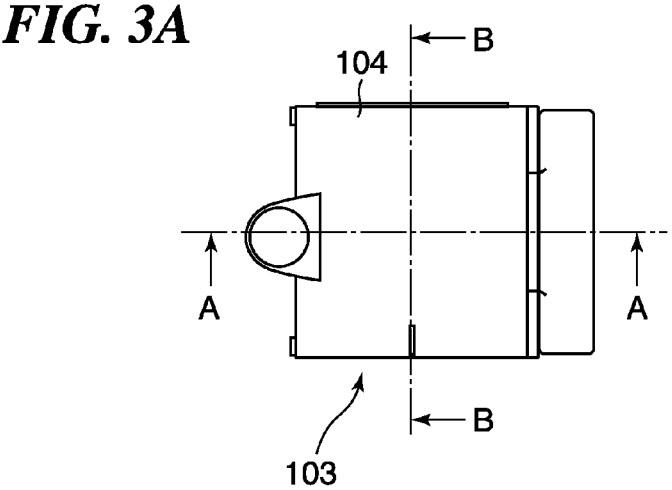
FIG. 3A is a top view of the microphone holder.
Figure 3B:
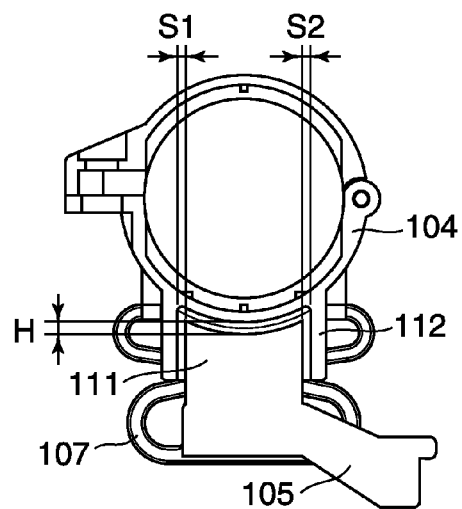
FIG. 3B is a cross-sectional view of the microphone holder taken along line A-A in FIG. 3A.
Figure 3C:
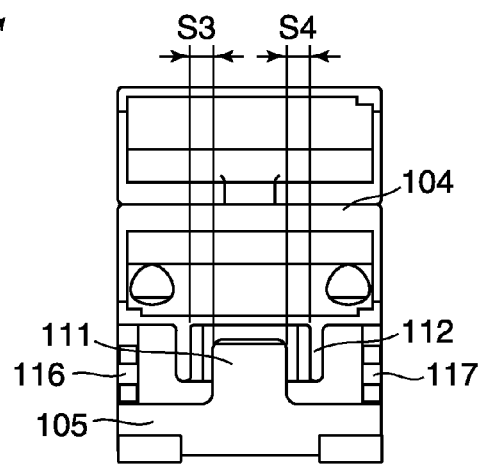
FIG. 3C is a cross-sectional view of the microphone holder taken along line B-B in FIG. 3A.

FIG. 3A is a top view of the microphone holder 103, FIG. 3B is a cross-sectional view of the microphone holder 103 taken along line A-A in FIG. 3A, and FIG. 3C is a cross-sectional view of the microphone holder 103 taken along line B-B in FIG. 3A.

Referring to FIGS. 3A to 3C, the base portion 105 has a convex portion 111 which projects toward the holder portion 104, and the holder portion 104 has a concave portion 112 into which the convex portion 111 is inserted with a clearance left therebetween. The convex portion 111 has a substantially columnar shape, and the concave portion 112 has a substantially cylindrical shape.

In a normal state shown in FIGS. 3A to 3C where no load is imposed on the holder portion 104, a clearance is formed between the convex portion 111 and the concave portion 112, and the convex portion 111 and the concave portion 112 are not in contact with each other. When, for example, loads in the fore-and-aft direction and the lateral direction are imposed on the holder portion 104, the supporting portions 106 and 107 are elastically deformed, bringing inner walls of the convex portion 111 and the concave portion 112 into contact with each other.

This limits the amount of change in the position of the holder portion 104 relative to the base portion 105 to a predetermined amount or smaller and prevents excessive deformation of the supporting portions 106 and 107. Therefore, breakage or the like of the microphone holder 103 due to imposed loads is prevented. Moreover, the shapes of the convex portion 111 and the concave portion 112 according to the present embodiment produce the same effects even when a load in a downward direction is imposed on the holder portion 104.

It should be noted that although in the present embodiment, the base portion 105 is provided with the convex portion 111, and the holder portion 104 is provided with the concave portion 112, the base portion 105 may be provided with the concave portion 112, and the holder portion 104 may be provided with the convex portion 111.

Moreover, the convex portion 111 may have an external surface of which a shape is offset from a shape of an inner wall surface of the concave portion 112, so that when the supporting portions 106 and 107 are deformed, the convex portion 111 and the concave portion 112 can be brought into surface-to-surface contact with a low degree of stress concentration.

Dimensions of the above described clearance between the convex portion 111 and the concave portion 112 are determined so as to prevent plastic deformation of the supporting portions 106 and 107 in a state where the supporting portions 106 and 107 are deformed, and the convex portion 111 and the concave portion 112 are in contact with each other. The supporting portions 106 and 107 according to the present embodiment are flexible in the fore-and-aft direction, and hence clearance dimensions S3 and S4 in the fore-and-aft direction are greater than clearance dimension S1 and S2 in the lateral direction and a clearance dimension H in the up-and-down direction.

Also, this clearance dimensions are greater than the amount of change in the relative positions of the convex portion 111 and the concave portion 112 caused by an inertia force applied due to an ordinary action such as panning or tilting of the video camera 1 to which the base portion 105 is connected. For this reason, when the video camera 1 is in use under normal conditions, vibration noise arising from a collision between the convex portion 111 and the concave portion 112 is not generated.

As described above, the microphone holder 103 according to the present embodiment is flexible in the fore-and-aft direction, which is the axial direction of the microphone 2, and resists being deformed in the up-and-down direction and the lateral direction perpendicular to the axial direction of the microphone 2.

Referring next to FIGS. 4 to 8C, a description will be given of a microphone holder that is a second embodiment of the cylindrical member holding apparatus according to the present invention.

Figure 4:
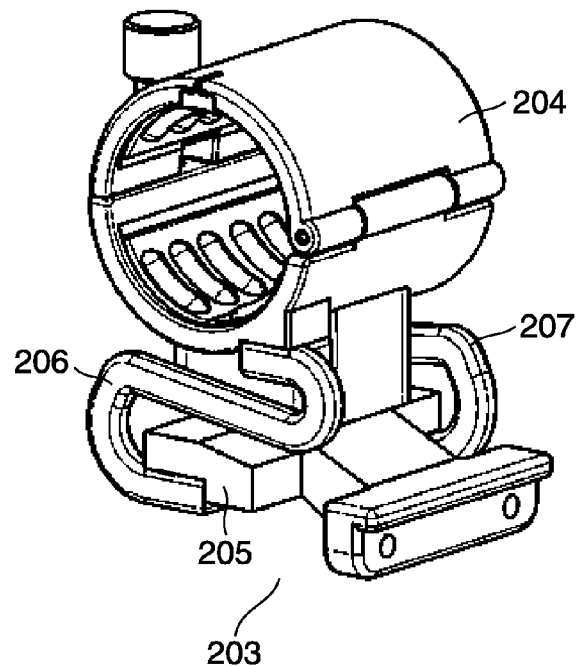
FIG. 4 is a perspective view of a microphone holder which is a second embodiment of the cylindrical member holding apparatus according to the present invention.

FIG. 4 is a perspective view of a microphone holder 203. Referring to FIG. 4, the microphone holder 203 has a holder portion 204, a base portion 205, and supporting portions 206 and 207.

The supporting portions 206 and 207 are made of a material with low tensile elasticity, and as with the supporting portions 106 and 107, have a function of connecting the holder portion 204 and the base portion 205 together while giving flexibility to them. It should be noted that basic configurations of the holder portion 204 and the base portion 205 are the same as those of the holder portion 104 and the base portion 105 according to the first embodiment except for a concave portion 212 and a convex portion 211, to be described later.

Figure 5:
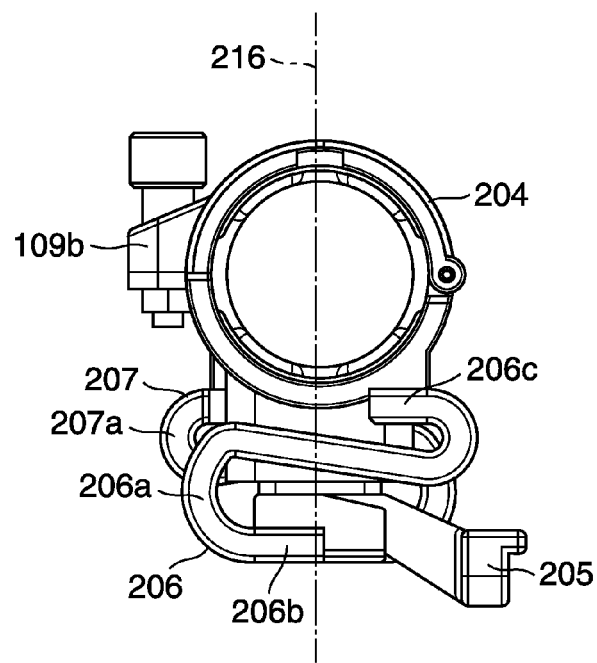
FIG. 5 is a front view of the microphone holder.

FIG. 5 is a front view of the microphone holder 203. Referring to FIG. 5, an axis 216 passes through a center line of the microphone 2 held by the holder portion 204 of the microphone holder 203 and also passes through the microphone holder 203 in the up-and-down direction (the direction of the axis b in FIG. 1).

Referring to FIG. 5, the supporting portion 206 has an arm portion 206a which is curved substantially in the form of an S. The arm portion 206a is curved from a connecting portion 206b connecting to the base portion 205, crosses the axis 216, and is further curved, so that a connecting portion 206c thereof is connected to the holder portion 204. The supporting portion 207 has the same shape as that of the supporting portion 206 from the viewpoint of its molding cost described above, but the supporting portion 207 is connected to the holder portion 204 and the base portion 205 in such an orientation as to be line symmetrical to the supporting portion 206 about the axis 216, that is, in an inverse orientation.

Like the arm portion 106a and the arm portion 107a according to the first embodiment described above, the arm portion 206a of the supporting portion 206 and the arm portion 207a of the supporting portion 207 are thinner in the fore-and-aft direction as compared to the up-and-down direction and the lateral direction, and thus they are easily deformed in the fore-and-aft direction. For this reason, the microphone holder 203 has high flexibility in the fore-and-aft direction, and as with the first embodiment described above, has low flexibility in the up-and-down direction.

Moreover, since the supporting portion 206 and the supporting portion 207 are disposed in inverse orientations, projected areas of the supporting portions 206 and 207 on planes perpendicular to each other in the fore-and-aft direction are increased. For this reason, the second moment of area under a load in the lateral direction on the supporting portions 206 and 207 is greater than under a load in the fore-and-aft direction, and as a result, the microphone holder 203 has low flexibility in the lateral direction.

It should be noted that the number of supporting portions which connect the holder portion 204 and the base portions 205 together may be three or more, but two of them need to be line symmetrical about the axis 216 so as to inhibit deformation caused by a load in the lateral direction. When the supporting portions 206 and 207 are projected on planes perpendicular to each other in the fore-and-aft direction, they cross each other on the axis 216 and thus form a substantially X shape as with the supporting porticos 106 and 107 according to the first embodiment described above.

Figure 6:
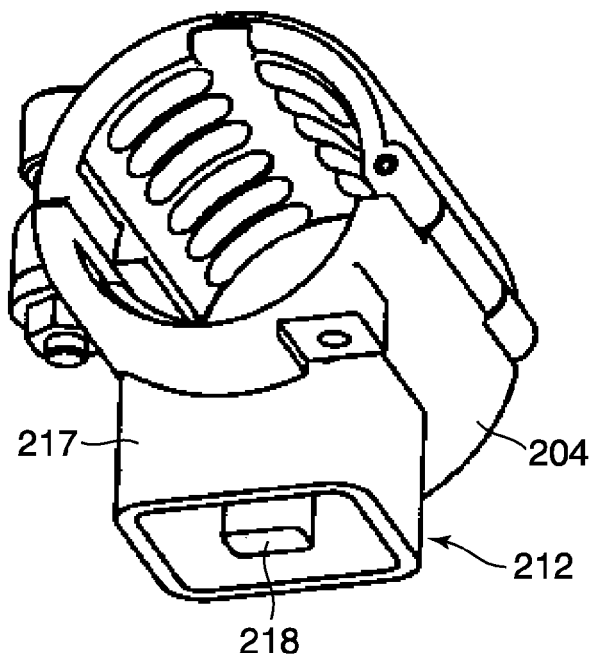
FIG. 6 is a perspective view of a holder portion.
Figure 7:
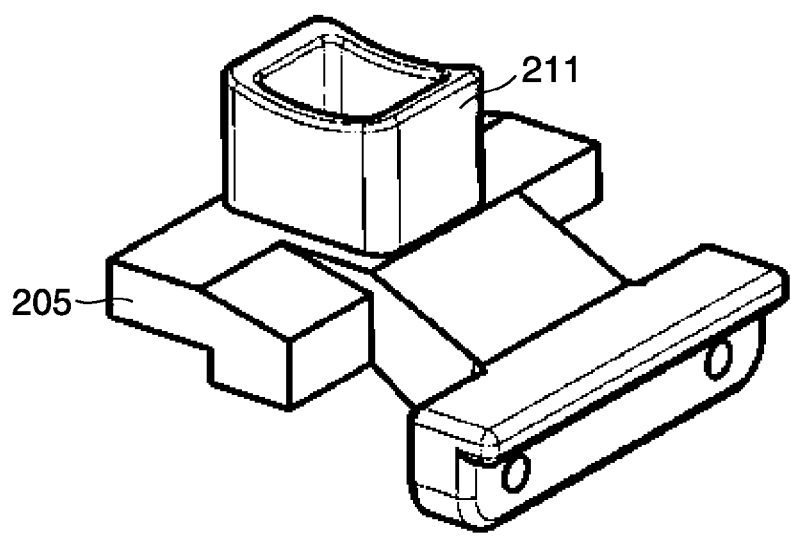
FIG. 7 is a perspective view of a base portion.

FIG. 6 is a perspective view of the holder portion 204. FIG. 7 is a perspective view of the base portion 205. Referring to FIG. 6, the concave portion 212 is provided in a lower part of the holder portion 204. The concave portion 212 has a cylinder portion 217 and a column portion 218, which is provided in a central part of the cylinder portion 217.

Referring to FIG. 7, the base portion 205 has a convex portion 211. The convex portion 211 has a cylindrical shape and is inserted into an annular space, which is formed between the cylinder portion 217 and the column portion 218 of the concave portion 212, with a predetermined clearance left.

Like the convex portion 111 and the concave portion 112 according to the first embodiment described above, the convex portion 211 and the concave portion 212 are not in contact with each other with the clearance left therebetween in a normal state where no load is imposed on the holder portion 204.

When loads in the fore-and-aft direction, the lateral direction, and the up-and-down direction are imposed on the holder portion 204, the supporting portions 206 and 207 are elastically deformed, causing the convex portion 211 and the concave portion 212 to come into contact with each other. This limits the amount of change in the position of the holder portion 204 relative to the base portion 205 to a predetermined amount or smaller and prevents breakage or the like of the microphone holder 203 due to the imposed loads.

Figure 8A:
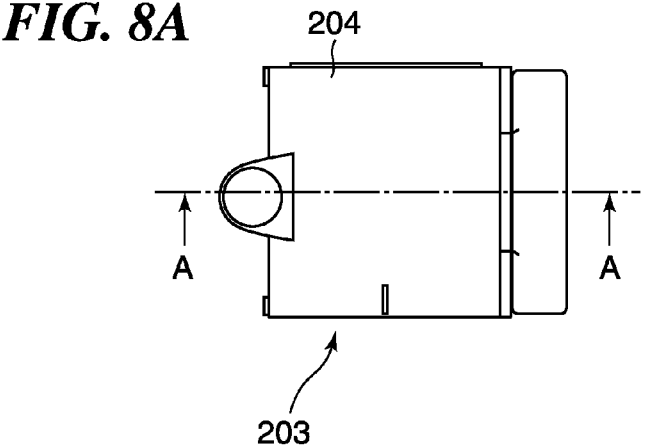
FIG. 8A is a top view of the microphone holder.
Figure 8B:
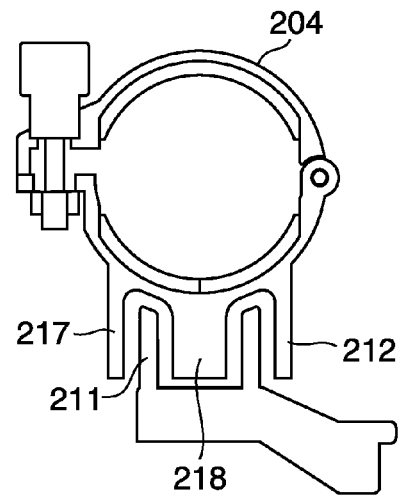
FIG. 8B is a cross-sectional view of the microphone holder taken along line A-A in FIG. 8A.
Figure 8C:
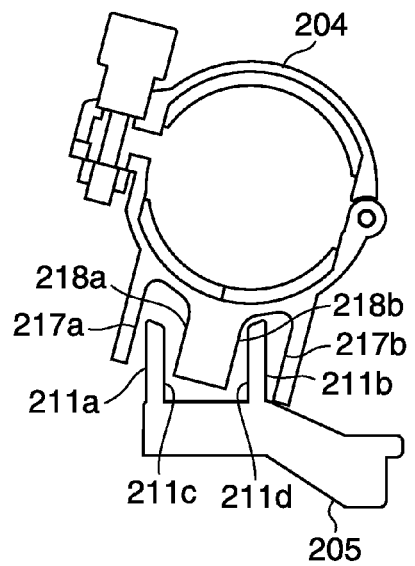
FIG. 8C is a cross-sectional view showing the positional relationship between the holder portion and the base portion when a load is imposed on the holder portion from lower left to upper right as viewed in the figure.

Referring next to FIGS. 8A to 8C, the convex portion 211 and the concave portion 212 will be described in further detail. FIG. 8A is a top view of the microphone holder 203, and FIG. 8B is a cross-sectional view of the microphone holder 203 taken along line A-A in FIG. 8A. FIG. 8B shows a state in which no load is imposed on the holder portion 204, and the supporting portions 206 and 207 are not deformed. FIG. 8C is a cross-sectional view showing the positional relationship between the holder portion 204 and the base portion 205 when a load is imposed on the holder portion 204 from lower left to upper right as viewed in the figure.

Referring to FIG. 8C, the holder portion 204 is tilted with respect to the base portion 205. At this time, a first inner wall 217a of the cylinder portion 217 in the concave portion 212 and a first outer wall 211a of the convex portion 211 come into contact with each other, and a second inner wall 217b of the cylinder portion 217 and a second outer wall 211b of the convex portion 211 come into contact with each other.

Also, a first outer wall 218a of the column portion 218 in the concave portion 212 and a first inner wall 211c of the convex portion 211 come into contact with each other, and a second outer wall 218b of the column portion 218 and a second inner wall 211d of the convex portion 211 come into contact with each other. Thus, in the state shown in FIG. 8C, the convex portion 211 and the concave portion 212 are in contact with each other at the four points. It should be noted that in FIG. 8C, there are clearances at the four points for the sake of convenience so as to make the positional relationship easily understandable.

Here, if the concave portion 212 is not provided with the cylinder position 217, the convex portion 211 and the concave portion 212 will be in contact with each other at two points, causing a force to act on the points of contact in a sliding direction due to the load from lower left as viewed in the figure, and hence the column portion 218 may run on the convex portion 211. When the column portion 218 may run on the convex portion 211, nothing limits the amount of deformation of the supporting portions 206 and 207 caused by an imposed load, and as a result, plastic deformation of the supporting portions 206 and 207 may occur.

On the other hand, according to the present embodiment, since the concave portion 212 is comprised of the cylinder position 217 and the column portion 218 as described above, the convex portion 211 and the concave portion 212 are easily engaged with each other when the holder portion 204 is tilted. This prevents the column portion 218 from running on the convex portion 211.

Although the effect of preventing the column portion 218 from running on the convex portion 211 when a load is imposed in the lateral direction has been described, the relationship between the convex portion 211 and the concave portion 212 in the fore-and-aft direction is substantially the same as the relationship between the convex portion 211 and the concave portion 212 in the lateral direction, and hence the same effects as those described above are obtained for a load in the fore-and-aft direction as well. It should be noted that the cylindrical shape of the convex portion 211 and the shape of the cylinder portion 217 in the concave portion 212 should not necessarily be a cylindrical shape with a completely continuous surface, but they may be a substantially cylindrical shape with intermittent surfaces. Other arrangements and effects are the same as those in the above described first embodiment.

Referring next to FIGS. 9 to 13, a description will be given of a microphone holder that is a third embodiment of the cylindrical member holding apparatus according to the present invention.

Figure 9:
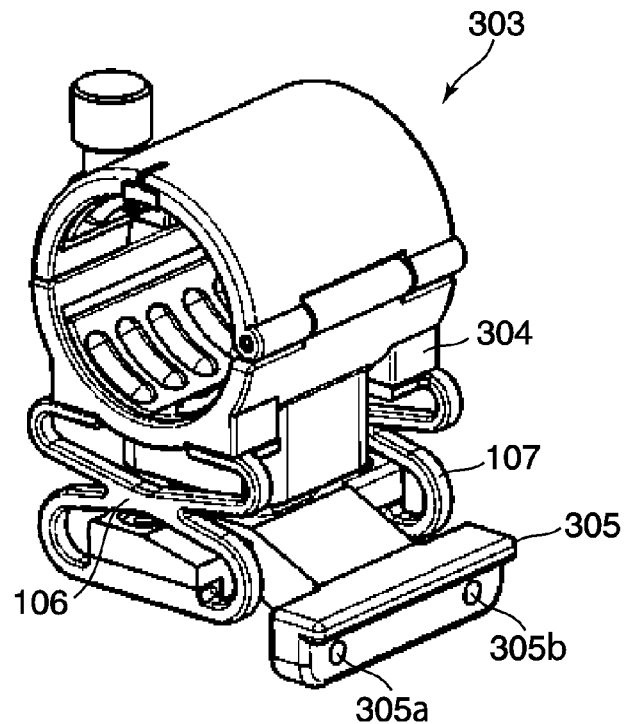
FIG. 9 is a perspective view of a microphone holder which is a third embodiment of the cylindrical member holding apparatus according to the present invention.

FIG. 9 is a perspective view of a microphone holder 303. Referring to FIG. 9, the microphone holder 203 has a holder portion 304, a base portion 305, and supporting portions 106 and 107.

The supporting portions 106 and 107 have the same arrangement as that of the supporting portions 106 and 107 according to the first embodiment described above, and basic configurations of the holder portion 304 and the base portion 305 are the same as those of the holder portion 104 and the base portion 105 according to the first embodiment described above except for a concave portion 312 and a convex portion 311, to be described later.

Figure 10:
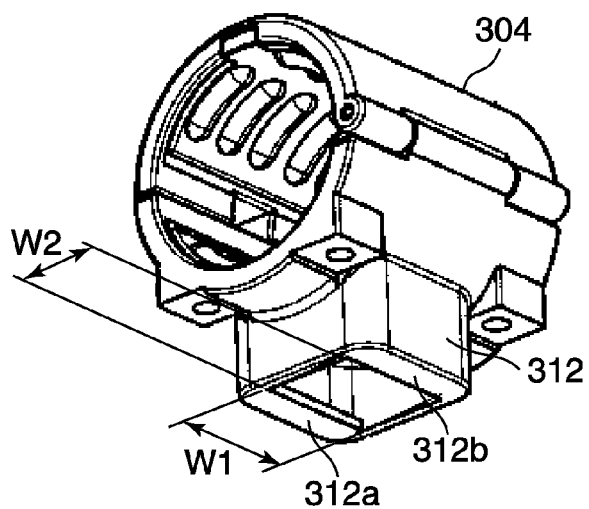
FIG. 10 is a perspective view of a holder portion.

FIG. 10 is a perspective view of the holder portion 304. Referring to FIG. 10, the concave portion 312 which has a cylindrical shape is provided in a lower part of the holder portion 304. On opposite sides of an opening of the concave portion 312 in the lateral direction, a projecting portion 312a and a projecting portion 312b are projected inward in such directions as to come closer to each other, and this narrows the opening of the concave portion 312.

Figure 11:
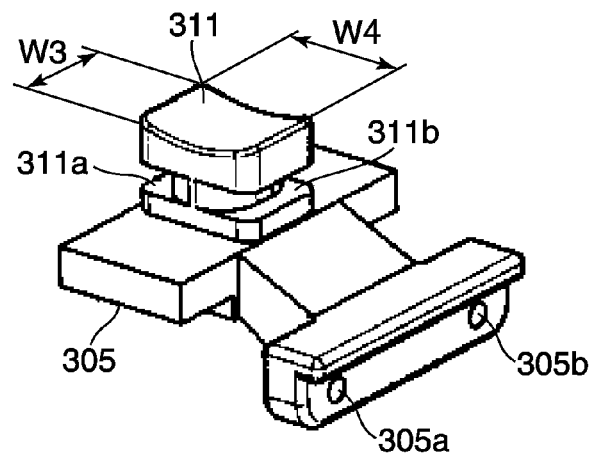
FIG. 11 is a perspective view of a base portion.

FIG. 11 is a perspective view of the base portion 305. Referring to FIG. 11, screw holes 305a and 305b for fastening the base portion 305 to the video camera 1 by screws, not shown, are formed in the base portion 305. The base portion 305 also has the convex portion 311 which has a columnar shape and is inserted into the concave portion 312. A cut portion 311a and a cut portion 311b are formed on opposite sides of the convex portion 311 in the lateral direction.

Figure 12A:
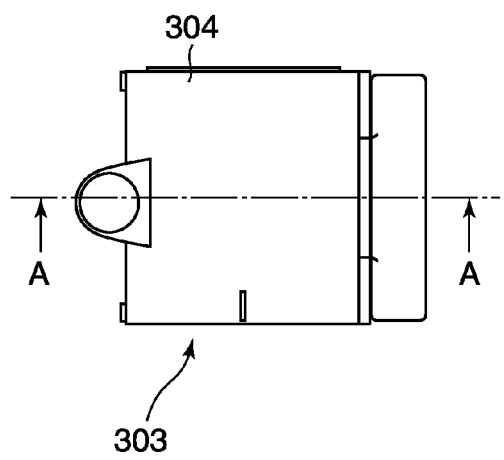
FIG. 12A is a top view of the microphone holder.
Figure 12B:
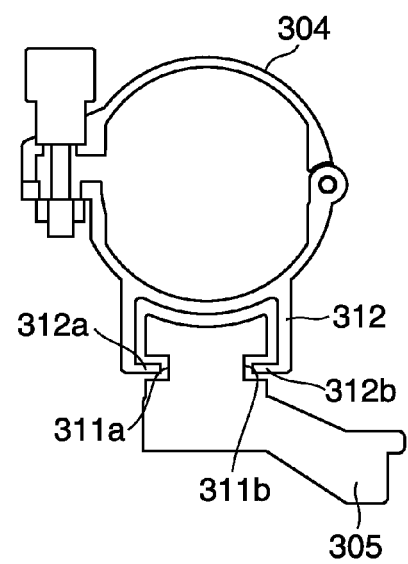
FIG. 12B is a cross-sectional view of the microphone holder taken along line A-A in FIG. 12A.

FIG. 12A is a top view of the microphone holder 303, and FIG. 12B is a cross-sectional view of the microphone holder 303 taken along line A-A in FIG. 12A.

Referring to FIG. 12B, the projecting portions 312a and 312b of the concave portion 312 are inserted into the cut portions 311a and 311b of the convex portion 311 with predetermined clearances left. When a load in the upward direction is imposed on the holder portion 304, the projecting portion 312a comes into abutment with the cut portion 311a, and the projecting portion 312b comes into abutment with the cut portion 311b. This limits the amount of change in the position of the holder portion 304 relative to the base portion 305 to a predetermined amount or smaller and prevents breakage or the like of the microphone holder 303 due to the imposed load.

Figure 13:
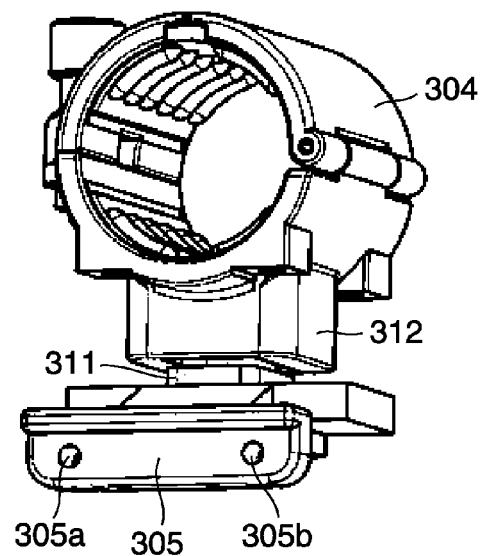
FIG. 13 is a perspective view useful in explaining how a convex portion is inserted into a concave portion.

Referring next to FIGS. 10, 11, and 13, a description will be given of how the convex portion 311 is inserted into the concave portion 312.

Referring to FIGS. 10 and 11, a clearance W1 in the concave portion 312 in the fore-and-aft direction is longer than an outside dimension W4 of the convex portion 311 in the lateral direction, and a clearance W2 in the concave portion 312 in the lateral direction is longer than an outside dimension W3 of the convex portion 311 in the fore-and-aft direction.

With the dimensional relationship described above, the convex portion 311 is inserted into the concave portion 312 with axes of the screw holes 305a and 305b of the base portion 305 being set parallel to the axis of the holder portion 304 as shown in FIG. 13.

Then, in a state where the convex portion 311 is inserted in the concave portion 312, and the cut portions 311a and 311b and the projecting portions 312a and 312b are at substantially the same positions, the base portion 305 is rotated about 90 degrees about an axis in the up-and-down direction. As a result, orientations of the holder portion 304 and the base portions 305 are as shown in FIG. 9.

Attaching each of the supporting portions 106 and 107 to the holder portion 304 and the base portion 305 using an adhesive agent or the like in this state completes assembly of the microphone holder 303. This arrangement prevents plastic deformation of the supporting portions 106 and 107 caused by a load in the up-and-down direction. Other arrangements and effects are the same as those in the above described first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing portion (CPU), micro processing portion (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-204738, filed Oct. 3, 2014, which is hereby incorporated by reference herein in its entirety.

What is claimed is:

1. A cylindrical member holding apparatus comprising:
a base portion;
a holder portion configured to hold a cylindrical member; and
a plurality of elastically-deformable supporting portions configured to be disposed respective opposite sides of the cylindrical member, which is held by said holder portion, in a direction of an axis of the cylindrical member and connect said base portion and said holder portion together, wherein:

said plurality of supporting portions have such a shape as to be more easily elastically deformed in a first direction than in a second direction and a third direction, where the first direction is the direction of the axis of the cylindrical member held by said holder portion, the second direction is a direction that is perpendicular to the first direction and connects said holder portion and said base portion together, and the third direction is a direction that is perpendicular to the first direction and also perpendicular to the second direction, one of said holder portion and said base portion is provided with a convex portion, and the other one of said holder portion and said base portion is provided with a concave portion into which the convex portion is inserted with a clearance left and in a noncontact state, and the clearance is configured to have such dimensions as to limit an amount of change in position of said holder portion relative to said base portion to a predetermined amount or smaller.

2. The cylindrical member holding apparatus according to claim 1, wherein each of said plurality of supporting portions has two arms crossing each other in an X shape, two end portions among four end portions of the X shape being connected to said holder portion, and the other two end portions among the four end portions of the X-shape being connected to said base portion.

3. The cylindrical member holding apparatus according to claim 1, wherein said plurality of supporting portions have the shape.

4. The cylindrical member holding apparatus according to claim 1, wherein a width of the supporting portions in the third direction is equal to a width of said holder portion in the third direction.

5. The cylindrical member holding apparatus according to claim 1, wherein said base portion is removably attached to electronic equipment.

6. The cylindrical member holding apparatus according to claim 1, wherein the cylindrical member is a microphone.

* * * * *